(12) United States Patent
Kuwahara et al.

(10) Patent No.: US 11,082,907 B2
(45) Date of Patent: Aug. 3, 2021

(54) UNMANNED TRAVELING VEHICLE, TRAVEL SYSTEM, AND METHOD FOR CONTROLLING UNMANNED TRAVELING VEHICLE

(71) Applicant: MURATA MACHINERY, LTD., Kyoto (JP)

(72) Inventors: Tetsuya Kuwahara, Kyoto (JP); Yoshinori Nakai, Kyoto (JP); Yasuhisa Ito, Ise (JP); Wataru Kitamura, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 161 days.

(21) Appl. No.: 16/480,707

(22) PCT Filed: Dec. 13, 2017

(86) PCT No.: PCT/JP2017/044788
§ 371 (c)(1),
(2) Date: Jul. 25, 2019

(87) PCT Pub. No.: WO2018/142781
PCT Pub. Date: Aug. 9, 2018

(65) Prior Publication Data
US 2021/0136648 A1    May 6, 2021

(30) Foreign Application Priority Data
Jan. 31, 2017 (JP) .............................. JP2017-016077

(51) Int. Cl.
*H04W 36/22* (2009.01)
*H04W 36/32* (2009.01)
*H04W 4/44* (2018.01)
*H04B 7/185* (2006.01)

(52) U.S. Cl.
CPC ........ *H04W 36/32* (2013.01); *H04B 7/18504* (2013.01); *H04W 4/44* (2018.02)

(58) Field of Classification Search
CPC ....... H04W 36/14; H04W 36/32; H04W 4/00; H04W 4/44; H04W 48/16; H04W 88/06
See application file for complete search history.

(56) References Cited

U.S. PATENT DOCUMENTS

| 2003/0060201 | A1* | 3/2003 | Soliman | ................ H04W 36/32 455/442 |
| 2009/0109241 | A1* | 4/2009 | Tsujimoto | ................ H04N 7/18 345/633 |

(Continued)

FOREIGN PATENT DOCUMENTS

| JP | 64-9508 A | 1/1989 |
| JP | 3405928 B2 | 5/2003 |

(Continued)

OTHER PUBLICATIONS

English translation of Official Communication issued in International Patent Application No. PCT/JP2017/044788, dated Aug. 1, 2019.

(Continued)

*Primary Examiner* — Mewale A Ambaye
(74) *Attorney, Agent, or Firm* — Keating & Bennett, LLP

(57) ABSTRACT

An unmanned traveling vehicle includes a block information acquirer that acquires position information on blocks each of which is a range of positions in an area within which the unmanned traveling vehicle is allowed to travel and channel information indicating a wireless channel available inside each of the blocks, a position acquirer that acquires a current position of the unmanned traveling vehicle, a determiner that identifies a block including the current position acquired by the position acquirer from among the blocks with reference to the position information, and determines, with (Continued)

reference to the channel information, a wireless channel to be used for wireless communication inside the block identified, and a communicator that performs the wireless communication by the wireless channel determined by the determiner and indicated by the channel information.

6 Claims, 9 Drawing Sheets

(56) References Cited

U.S. PATENT DOCUMENTS

| | | | | |
|---|---|---|---|---|
| 2014/0141784 A1* | 5/2014 | Schmidt | ............... | H04W 36/32 |
| | | | | 455/437 |
| 2016/0300493 A1* | 10/2016 | Ubhi | .................. | H04B 7/18504 |
| 2018/0063261 A1* | 3/2018 | Moghe | ............. | H04W 36/0083 |
| 2018/0097560 A1* | 4/2018 | Jalali | .................. | H04B 7/18504 |
| 2020/0229060 A1* | 7/2020 | Solondz | ................ | H04W 36/08 |

FOREIGN PATENT DOCUMENTS

| | | |
|---|---|---|
| JP | 2005-86439 A | 3/2005 |
| JP | 2014-192577 A | 10/2014 |
| JP | 2015-192319 A | 11/2015 |

OTHER PUBLICATIONS

Official Communication issued in International Patent Application No. PCT/JP2017/044788, dated Feb. 13, 2018.

\* cited by examiner

| Block | Zone |
|---|---|
| R1 | Z1 ~ Z25 |
| S1 | Z26 ~ Z50 |
| ... | ... |

| Block | Available channel | |
|---|---|---|
| | 2.4 GHz | 5 GHz |
| R1 | 1 | 36 |
| S1 | 1 | 40 |
| T1 | 11 | 40 |
| U1 | 11 | 44 |
| ... | ... | ... |

# UNMANNED TRAVELING VEHICLE, TRAVEL SYSTEM, AND METHOD FOR CONTROLLING UNMANNED TRAVELING VEHICLE

BACKGROUND OF THE INVENTION

1. Field of the Invention

The present invention relates to an unmanned traveling vehicle, a travel system, and a method for controlling an unmanned traveling vehicle

2. Description of the Related Art

In a facility such as a factory, an unmanned traveling vehicle to convey goods, for example, is used. The unmanned traveling vehicle communicates with, for example, a controller for controlling traveling of the unmanned traveling vehicle to receive control information on the traveling from the controller and travels according to the received control information. The unmanned traveling vehicle performs the communication with the controller through wireless communication in which a plurality of base station apparatuses (hereinafter, referred to simply as base stations) covering the inside of the facility are switched to be used.

In general, when a wireless communication terminal (the above unmanned traveling vehicle also included) switches its connection for wireless communication from one base station to another (roaming), the wireless communication terminal performs carrier sense (scan) for searching for base stations and the like over a plurality of channels to which the wireless communication terminal can be connected, in response to detection of a deterioration in quality of connected wireless communication with the one base station. In switching the connection for the wireless communication, a communication interruption time period of several seconds takes place due to detecting a deterioration in wireless communication quality, the scanning, or the like.

Japanese Unexamined Patent Application Publication No. 2014-192577 discloses a technique in which in a case where a terminal wirelessly communicating with a base station is expected to move, a roaming process is performed based on a predicted position of the terminal.

SUMMARY OF THE INVENTION

In the technique disclosed by Japanese Unexamined Patent Application Publication No. 2014-192577, the wireless communication terminal performs the roaming based on conditions concerning the predicted position even before actually detecting a deterioration in quality of the wireless communication, and a time required for the roaming is able to be reduced by a time taken required to detect the deterioration in quality. However, the technique still has a problem in that the roaming involves a time for scanning (about several hundreds of milliseconds to several seconds).

Preferred embodiments of the present invention provide unmanned traveling vehicles, in each of which, a time required for roaming is able to be reduced.

In accordance with a preferred embodiment of the present invention, an unmanned traveling vehicle includes a block information acquirer to acquire position information and channel information, the position information being information on blocks each of which is a range of positions in an area within which the unmanned traveling vehicle is allowed to travel, the channel information indicating a wireless channel available inside each of the blocks; a position acquirer to acquire a current position of the unmanned traveling vehicle; a determiner to identify, with reference to the position information, a block including the current position acquired by the position acquirer from among the blocks, and determine, with reference to the channel information, a wireless channel to be used for wireless communication inside the block identified; and a communicator to perform the wireless communication using the wireless channel determined by the determiner and indicated by the channel information.

With this configuration, the unmanned traveling vehicle performs the wireless communication using a wireless channel available at the current position that is specified based on the block within which the unmanned traveling vehicle is. This enables the wireless communication to be performed with an appropriate wireless channel without carrier sensing (scanning), which is performed by a conventional wireless terminal in roaming. This configuration reduces the time required for the unmanned traveling vehicle to perform the roaming.

Furthermore, the block information acquirer acquires, as the channel information, channel information indicating two or more wireless channels available inside each of the blocks, the determiner determines, with reference to the channel information, two or more wireless channels to be used for the wireless communication inside the block identified, and the communicator includes two or more wireless interfaces, and performs the wireless communication using the two or more wireless channels determined by the determiner through the two or more wireless interfaces.

With this configuration, the unmanned traveling vehicle establishes connection with a base station through an appropriate one among two or more wireless interfaces. The unmanned traveling vehicle is able to use the two or more wireless interfaces for the communication, and thus even when one of the wireless interfaces becomes unable to perform the communication due to roaming, the other is still able to perform the communication. This further reduces a communication interruption time that may arise in the roaming by the unmanned traveling vehicle.

Furthermore, the two or more wireless interfaces included in the communicator use telecommunications standards different from one another.

With this configuration, the unmanned traveling vehicle is able to use an appropriate one of two or more different telecommunications standards through a corresponding one of the two or more wireless interfaces to perform the wireless communication. In general, different telecommunications standards lead to different results regarding whether or not to be influenced by external noise or lead to different magnitudes of the influence of the external noise. This increases a possibility that even if communication conforming to one of telecommunications standards becomes disabled under influence of external noise or the like, communication conforming to another telecommunications standard is still enabled, which further reduces a time during which the unmanned traveling vehicle cannot perform communication.

Furthermore, the position information includes at least position information of each of two neighboring blocks among the blocks, and in the channel information, at least one of wireless channels available inside the two neighboring blocks is shared by the two neighboring blocks.

With this configuration, the channel information is defined such that the unmanned traveling vehicle is able to use the same channel in the two adjacent blocks. This allows the unmanned traveling vehicle to avoid performing the roaming when moving from one of the two blocks to another, which is able to reduce or prevent communication interruption time.

Furthermore, the communicator further transmits strength information to a controller, the strength information indicating a reception strength of a radio wave from a base station and the current position acquired by the position acquirer, and the block information acquirer acquires, as the position information and the channel information, position information and channel information that are updated by the controller based on the reception strength transmitted by the communicator.

With this configuration, the unmanned traveling vehicle acquires the position information and the channel information that are updated based on a condition of receiving radio waves from a base station at a time when the unmanned traveling vehicle actually travels. This enables the roaming to be performed with the position information and the channel information that are generated according to an actual radio-wave condition, thus reducing the time required for the roaming.

Furthermore, there are provided: an acquirer to acquire the strength information transmitted by the communicator of the above-described unmanned traveling vehicle, an updater to update at least one of the position information and the channel information based on the reception strength and the current position included in the strength information acquired by the acquirer, and a transmitter to transmit the at least one of the position information and the channel information updated by the updater to the unmanned traveling vehicle.

With this configuration, a travel system is able to update the position information and the channel information to be referred to by the unmanned traveling vehicle based on the strength information transmitted by the unmanned traveling vehicle, and provide the updated position information and the updated channel information to the unmanned traveling vehicle. A radio wave condition in wireless communication is able to vary by disposition of goods, an operational condition of a facility, and the like. Hence, by causing the unmanned traveling vehicle to perform the roaming using the position information and the channel information that are generated in conformity with an actual radio-wave condition, the time required for the roaming is able to be reduced.

In accordance with another preferred embodiment of the present invention, a method for controlling an unmanned traveling vehicle includes acquiring position information and channel information, the position information being information on blocks each of which is a range of positions in an area within which the unmanned traveling vehicle is allowed to travel, the channel information indicating a wireless channel available inside each of the blocks; acquiring a current position of the unmanned traveling vehicle; identifying, with reference to the position information, a block including the current position acquired in the acquiring of the current position from among the blocks, and determining, with reference to the channel information, a wireless channel to be used for wireless communication inside the block identified; and performing the wireless communication by the wireless channel determined in the determining and indicated by the channel information.

This control method achieves the same advantageous effects as that of the above unmanned traveling vehicle.

Preferred embodiments of the present invention are able to reduce a time required for a terminal device and the like to perform roaming.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments are described in greater detail with reference to the accompanying Drawings.

It should be noted that all the preferred embodiments described below are preferable examples of the present invention. Numerical values, shapes, materials, elements, arrangement positions and the connection configuration of the elements, steps, the order of the steps, and the like described in the following preferred embodiments are merely examples, and are not intended to limit the present invention. Preferred embodiments of the present invention are characterized by the appended claims. Therefore, among the elements in the following preferred embodiments, elements that are not described in independent claims that show the most generic concepts of preferred embodiments of the present invention are described as elements included in more desirable configurations. It should be noted that identical elements are assigned with a same reference sign, and explanation of such identical elements is sometimes not repeated or simplified.

Preferred Embodiment 1

The present preferred embodiment will describe an unmanned traveling vehicle and the like for which a time required for roaming is reduced.

The unmanned traveling vehicle according to the present preferred embodiment can be implemented as, for example, an unmanned traveling vehicle that communicates with a controller in wireless communication for which a plurality of base stations covering the inside of a facility are switched to be used. A communication terminal such as a personal computer, a mobile phone terminal, or a tablet may be used, in place of the unmanned traveling vehicle according to the present preferred embodiment.

Figure 1:
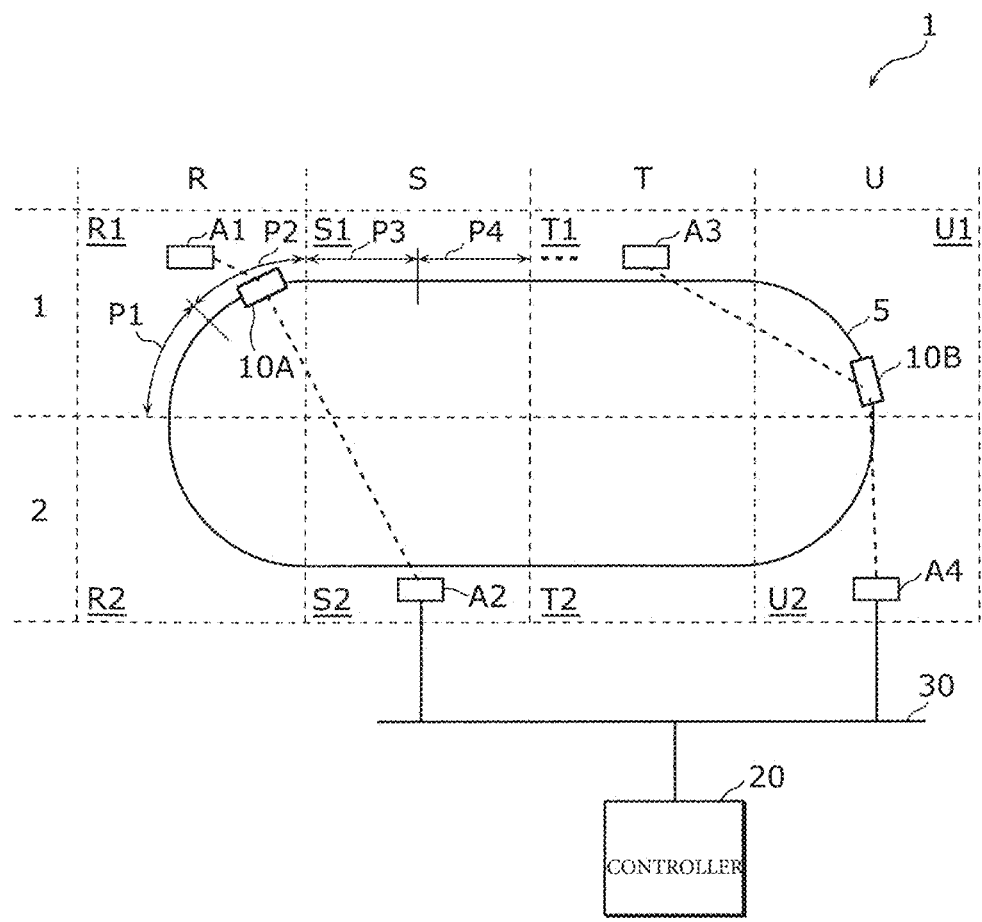
FIG. 1 is a schematic diagram illustrating a network configuration of a travel system that includes an unmanned traveling vehicle according to Preferred Embodiment 1 of the present invention.

FIG. 1 is a schematic diagram illustrating a network configuration of a travel system 1 that includes unmanned traveling vehicles 10A and 10B, and the like, according to the present preferred embodiment. FIG. 1 illustrates a diagram of a facility in which the travel system 1 is deployed as viewed from the top and a network configuration diagram in combination.

The travel system 1 is a rail-based travel system in which a controller 20 performs computer control to cause the unmanned traveling vehicle 10A and the like to travel on a track 5 that is a traveling path provided in advance to a ceiling, a floor, and/or the like in the facility. The unmanned traveling vehicle 10A is configured to move or convey goods to an indicated position under the control by the controller 20.

Although the travel system 1 will be described as a rail-based travel system by way of example, but note that the following description can be applied also to a non-rail-based travel system (see Modification 2 of Preferred Embodiment 1 described later).

As illustrated in FIG. 1, the travel system 1 includes the unmanned traveling vehicles 10A and 10B, base stations A1, A2, A3, and A4, the controller 20, and a LAN 30.

The unmanned traveling vehicles 10A and 10B are each an unmanned traveling vehicle that travels on the track 5 with no person on-board and travels under the control by the controller 20. The unmanned traveling vehicles 10A and 10B will be referred to also as unmanned traveling vehicles 10. A number of the unmanned traveling vehicles 10 is not limited to two and may be any number more than one.

The unmanned traveling vehicles 10 are configured to travel on the track 5 freely based on the control of the controller 20 to, for example, convey goods. The unmanned traveling vehicles 10 each include one or more wireless interfaces (hereinafter, referred to also as wireless IF) and are each configured to establish a wireless communication link (hereinafter, referred to simply as a communication link) with the base station A1 or the like, and receive instructions from the controller 20 in wireless communication using the wireless communication link.

The unmanned traveling vehicles 10 are each configured to perform switching between base stations to establish a communication link (roaming). Here, a case in which the unmanned traveling vehicles 10 each use two wireless IFs to establish connections with two base stations will be described by way of example. For example, in FIG. 1, the unmanned traveling vehicle 10A establishes communication links to the base stations A1 and A2, and the unmanned traveling vehicle 10B establishes communication links to the base stations A3 and A4. Positions on the track 5 are partitioned into a plurality of blocks, with which positions of the unmanned traveling vehicles 10 can be located. The blocks are illustrated by broken lines in FIG. 1, being arranged in order of blocks R1, S1, T1, U1 from the left to the right on an upper side of the paper and blocks R2, S2, T2, U2 from the left to the right on a lower side. The blocks illustrated in FIG. 1 are partitioned into to have rectangular or substantially rectangular shape, but note that the shape of the blocks is not limited to this and the blocks may be partitioned into to have any shape.

Each of the base stations A1, A2, A3, and A4 (hereinafter, referred to also as the base station A1 and the like) is a base station apparatus that establishes a communication link to an unmanned traveling vehicle 10 to perform wireless communication with the unmanned traveling vehicle 10. A number of the base station A1 and the like is not limited to four and may be any number more than one.

The base station A1 and the like performs the wireless communication using a communication interface such as wireless LAN conforming to IEEE 802.11a, b, g, n standards or the like. The base station A1 and the like are disposed at positions that enable wireless communication areas of the base stations to cover the track 5. At this time, communication areas for the wireless communication of neighboring base stations are allowed to overlap, but the neighboring base stations are preferably disposed such that the overlap between the communication areas is not excessively large or any location of the track 5 that is not covered by the communication areas is not left.

Wireless communication channels used by the base station A1 and the like for the wireless communication (hereinafter, referred to also as wireless channels or channels) are assumed to be predetermined. Hereinafter, a case where the channels used by the base stations A1, A2, A3, and A4 for the wireless communication are channels 1, 6, 11, and 1 of IEEE 802.11g, respectively, will be described by way of example, but the channels are not limited to this case.

In addition, the base stations A1 and the like are connected to the LAN 30, and relays communication between the unmanned traveling vehicles 10 and the controller 20. In FIG. 1, connections between the base stations A1 and A3, and the LAN 30 are omitted.

The controller 20 is a controller that controls the operation of the unmanned traveling vehicles 10 by using a computer. Specifically, the controller 20 transmits, to unmanned traveling vehicles 10, moving instructions that cause the unmanned traveling vehicle 10 to move to a predetermined position, and conveying instructions that cause the unmanned traveling vehicle 10 to convey goods.

The LAN 30 is a local area network to which the base station A1 and the like and the controller 20 are connected. The LAN 30 is a wired LAN conforming to, for example, IEEE 802.3 standard or the like, or a wireless LAN conforming to, for example, IEEE 802.11a, b, g, n standards or the like.

In the travel system 1, an area where the unmanned traveling vehicles 10 can travel, that is, the positions of the track 5 are partitioned into the plurality of blocks. Each of the unmanned traveling vehicles 10 establishes a communication link to a base station that is appropriate for a block within which the unmanned traveling vehicle 10 is located. By associating a block within which an unmanned traveling vehicle 10 is positioned with a base station available in the block, the unmanned traveling vehicle 10 is able to select and establish a communication link with the appropriate base station without scanning for a channel. This configuration is able to reduce the time required for the unmanned traveling vehicle 10 to perform the roaming.

A process of the roaming by the unmanned traveling vehicle 10 will be described in detail.

Figure 2:
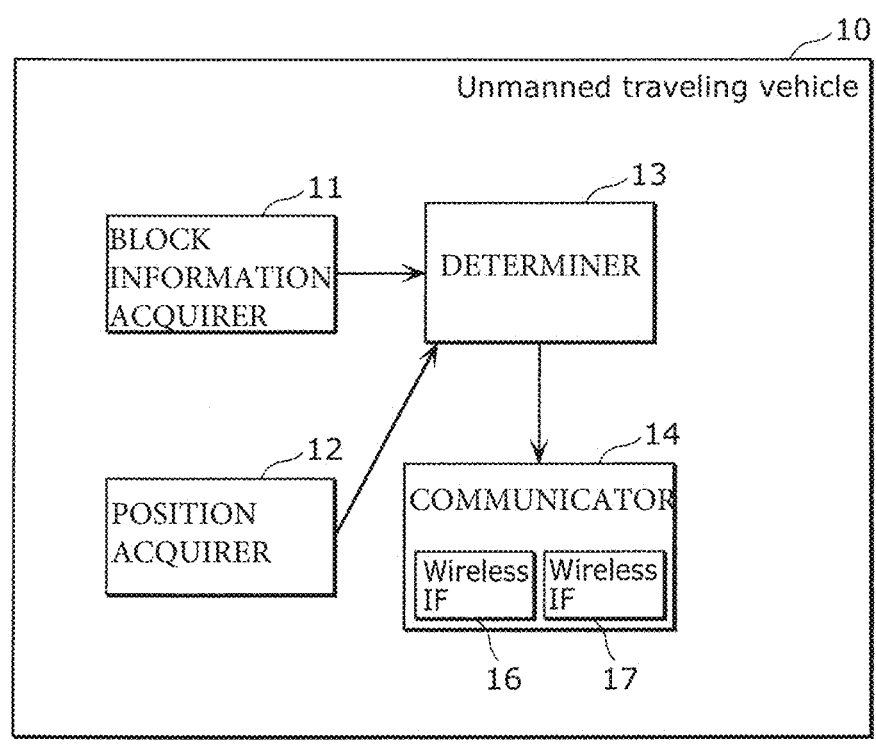
FIG. 2 is a block diagram illustrating a functional configuration of the unmanned traveling vehicle according to Preferred Embodiment 1 of the present invention.

FIG. 2 is a block diagram illustrating a functional configuration of an unmanned traveling vehicle 10 according to the present preferred embodiment.

As illustrated in FIG. 2, the unmanned traveling vehicle 10 includes a block information acquirer 11, a position acquirer 12, a determiner 13, and a communicator 14.

The block information acquirer 11 is a processor configured or programmed to acquire position information on blocks each of which is a range of positions in an area within which the unmanned traveling vehicle 10 is allowed to travel, and channel information indicating channels available inside each of the blocks. Here, the area within which the unmanned traveling vehicle 10 is allowed to travel refers to positions on the track 5. The "position information on a block" will be referred to simply as position information.

The block information acquirer 11 is configured to acquire the position information and the channel information from the controller 20. The position information and channel information to be acquired may be predetermined or may be updated by the controller 20 based on strength information (described later) transmitted by the communicator 14.

The position information and the channel information will be described specifically.

The position information is information indicating a position of a block uniquely.

Figure 3:
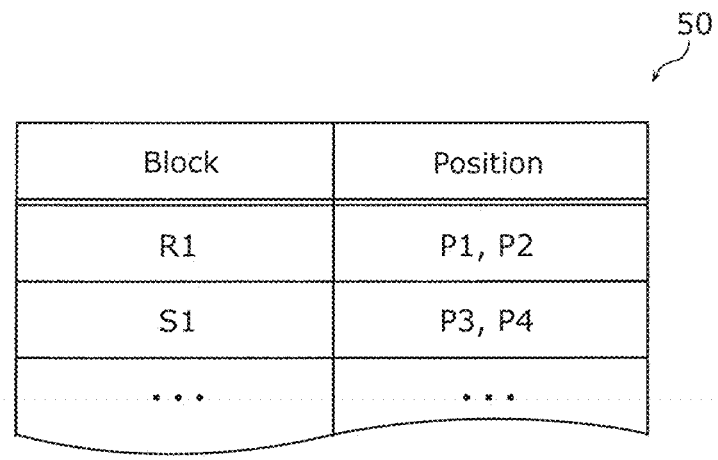
FIG. 3 is an explanatory diagram illustrating position information on blocks according to Preferred Embodiment 1 of the present invention.

The position information will be described specifically with reference to FIG. 3. FIG. 3 is an explanatory diagram illustrating the position information 50 on the blocks according to the present preferred embodiment.

In the position information 50, entries (rows) represent pieces of information that associate each of the blocks R1, S1, and the like specified on the track 5 with positions P1, P2, and the like on the track 5 included in the each block. The position information 50 can also be regarded as information that associates the positions P1, P2, and the like defined on the track 5 with the blocks within which the positions are located.

For example, in the position information 50 illustrated in FIG. 3, a first entry indicates that the positions P1 and P2 on the track 5 are associated with the block R1, and a second entry indicates that positions P3 and P4 on the track 5 are associated with the block S1.

Note that the position information is not limited to the above form. For example, a non-rail-based travel system can adopt a method based on positions in a facility rather than based on a track (see Modification 2 of Preferred Embodiment 1 described later).

The channel information is information that associates the blocks indicated in the position information with channels available inside the blocks.

Figure 4:
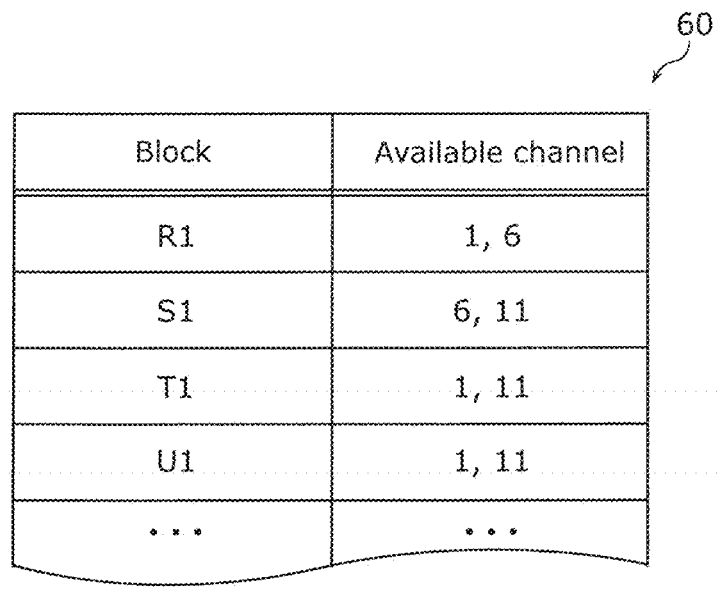
FIG. 4 is an explanatory diagram illustrating channel information according to Preferred Embodiment 1 of the present invention.

The channel information will be described with reference to FIG. 4. FIG. 4 is an explanatory diagram illustrating channel information 60 according to the present preferred embodiment.

In the channel information 60 illustrated in FIG. 4, entries (rows) each include a block and channels available inside the block. For example, a first entry of the channel information 60 indicates that channels 1 and 6 are available inside the block R1. A second entry of the channel information 60 indicates that channels 6 and 11 are available inside the block S1.

Here, one of features of the channel information 60 is that at least one of channels available inside neighboring blocks is common to the neighboring blocks. Specifically, for example, of channels available in the neighboring blocks R1 and S1, the channel 6 is common to the blocks R1 and S1. Of channels available in neighboring blocks S1 and T1, a channel 11 is common to the blocks S1 and T1. Specifying the channel information 60 in this manner has an advantage in that an unmanned traveling vehicle 10 can continue communication without roaming when the unmanned traveling vehicle 10 crosses a boundary between blocks to move into a neighboring block. Note that it is not necessary to make all neighboring relations of the blocks to have the above-described feature. This is because when at least one neighboring relation has the above-described feature, the advantage described above can be exploited in a movement between blocks in the at least one neighboring relation.

Referring back to FIG. 2, the position acquirer 12 is a processor configured or programmed to acquire current positions of the unmanned traveling vehicles 10. The position acquirer 12 is configured to acquire the current positions by a well-known method using radio waves, light, or the like. For example, the current positions of the unmanned traveling vehicles 10 are acquired with light received from a plurality of light emitters disposed along the track 5. An example of a method for acquiring the current positions will be described with reference to FIG. 5.

Figure 5:
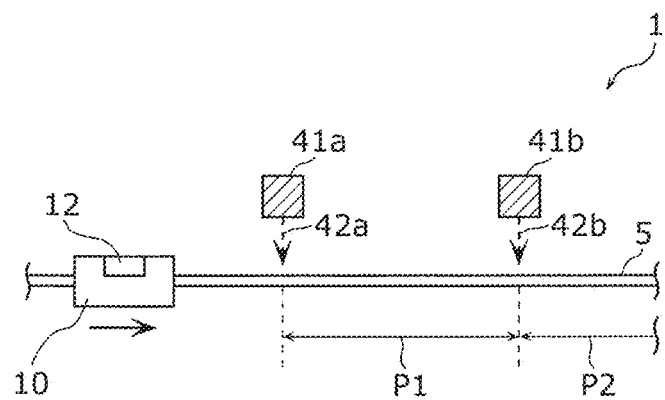
FIG. 5 is an explanatory diagram illustrating how a position acquirer according to Preferred Embodiment 1 of the present invention acquires position information on the unmanned traveling vehicle.

FIG. 5 is an explanatory diagram illustrating how the position acquirer 12 according to the present preferred embodiment acquires position information on an unmanned traveling vehicle 10.

In FIG. 5, the position acquirer 12 includes a light receiver. In addition, a plurality of light emitters 41a and 41b are disposed along the track 5. The light emitters 41a and 41b are configured to transmit, respectively, light signals 42a and 42b each including a piece of information specific to the corresponding light emitter. The pieces of specific information are assumed to be associated with the light emitters in advance. The position acquirer 12 uses the light receiver to receive the light signal 42a or 42b, refers to the association to identify the light emitter that has transmitted the light signal received by the light receiver, and creates information indicating a current position of the unmanned traveling vehicle 10. For example, when a latest light signal received by the light receiver is the light signal 42a, the position acquirer 12 identifies the light emitter 41a that has transmitted the light signal 42a, and acquires the position P1 between the light emitter 41a and the light emitter 41b, which is the next to the light emitter 41a, as the current position.

How to acquire the current position is not limited to methods using the light emitters and the light receiver. For example, how to acquire the current position may be a method in which the acquisition is made by optically reading and converting marking information on a bar code attached close to the track 5, or a method in which the acquisition is made by an indoor messaging system (IMES: Indoor MEssaging System) (so-called an indoor global positioning system (GPS)).

Moreover, how to acquire the current position may be a method in which the acquisition is made based on information from a travel controller that manages feedback information on a driving motor built in a traveling wheel (revolutions of the motor), a method in which the acquisition is made based on information from an acceleration sensor or an orientation sensor provided in an unmanned traveling vehicle 10, or a combined method of these methods and the above-described methods.

Referring to FIG. 2, the determiner 13 is a processor configured or programmed to identify, with reference to the position information 50, a block including the current position acquired by the position acquirer 12, and determine, with reference to the channel information, channels to be used for wireless communication inside the identified block.

The determiner 13 first identifies a block associated, in the position information, with the current position acquired by the position acquirer 12. For example, in a case where the current position acquired by the position acquirer 12 is the position P1 (see FIG. 1), the determiner identifies the block R1 as a block associated in the position information 50 with the position P1.

The determiner 13 next uses the channel information to determine channels to be used for the wireless communication inside the identified block. For example, in a case where the block R1 is identified, the determiner 13 uses the channel information 60 and determines channels 1 and 6 as channels to be used for the wireless communication inside the block R1. The determiner 13 then provides information indicating the determined channels to the communicator 14.

In a case where the position information is set such that a size of a unit block is small (in other words, a number of blocks is large), such a setting increases amount of information of the position information 50 but has an advantage in that the wireless communication can be performed in a channel having a better quality. Conversely, in a case where the position information is set such that a size of a unit block is large (in other words, a number of blocks is small), such a setting has an advantage in that the amount of information is able to be reduced while a communication quality is maintained. Tuning the position information 50 in this manner has an advantage of allowing determination as to which of reducing the amount of information and increase the channel quality should be more emphasized.

Note that in a case where channels available inside a block are more than a number of the wireless IFs, the determiner 13 selects the same number of channels as the number wireless IFs from among the channels available inside the block, and provides information indicating the selected channels to the communicator 14.

The communicator 14 is a communication processor configured or programmed to perform wireless communication with the base station A1 and the like. The communicator 14 includes one or more wireless IFs. Here, a case where the communicator 14 includes two wireless IFs 16 and 17 will be described by way of example. The two wireless IFs 16 and 17 correspond to a specific example of two or more wireless IFs.

Each of the wireless IFs 16 and 17 is a communication interface such as a wireless LAN interface conforming to, for example, IEEE 802.11a, b, g, n standards or the like. The wireless IFs 16 and 17 operate independently of each other. That is, the wireless IFs 16 and 17 perform data exchange, establishment and disconnection of communication links, and the like independently of each other under control by the communicator 14.

The communicator 14 is configured to acquire the information indicating the channels determined by the determiner 13 and uses the channels included in the information to perform wireless communication using the wireless IFs 16 and 17. For example, in a case where channels 1 and 6 are provided from the determiner 13 as the channels to be used for the wireless communication, the communicator 14 uses the channel 1 to establish a connection with the base station A1 using the wireless IF 16 and uses the channel 6 to establish a connection with the base station A2 using the wireless IF 17. Note that it is optional to determine which of the wireless IFs 16 and 17 establishes a connection with which of the base stations A1 and A2.

In the present preferred embodiment, a case where the wireless IFs 16 and 17 conform to the same telecommunications standard will be described by way of example. A case where the wireless IFs 16 and 17 conform to different telecommunications standards will be described later (see Preferred Embodiment 2).

As a result of the determiner determining the channels to be used by the communicator 14 for the wireless communication, the communicator 14 is able to perform roaming without scanning for searching for a new base station. This reduces the time required for the roaming.

In addition, the communicator 14 is configured to transmit the strength information, which indicates a reception strength of a radio wave from the base station A1 or the like and the current position acquired by the position acquirer 12, to the controller 20. The transmitted strength information is used in an update process of the position information and the channel information by the controller 20. The transmission of the strength information by the communicator is performed at appropriate time intervals and may be performed, for example, every constant time period. As an example of the reception strength of the radio wave from the base station A1 or the like, the received signal strength indicator (RSSI) is able to be adopted.

Figure 6:
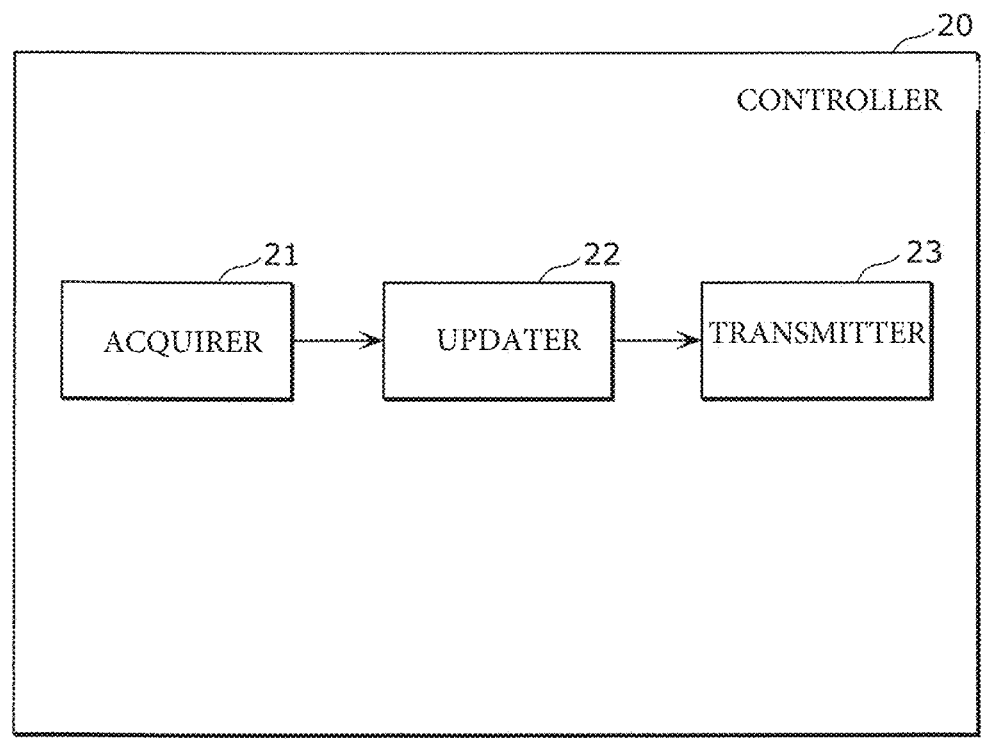
FIG. 6 is a block diagram illustrating a functional configuration of a controller according to Preferred Embodiment 1 of the present invention.

FIG. 6 is a block diagram illustrating a functional configuration of the controller 20 according to the present preferred embodiment.

As illustrated in FIG. 6, the controller 20 includes an acquirer 21, an updater 22, and a transmitter 23.

The acquirer 21 is a processor configured or programmed to acquire the strength information indicating the reception strength and the current position transmitted by the communicator 14 of the unmanned traveling vehicle 10.

The updater 22 is a processor configured or programmed to update at least one of the position information and the channel information based on the reception strength and the current position included in the strength information acquired by the acquirer 21. The updater 22 is configured to store reception strengths and current positions acquired by the acquirer 21 and analyze reception strengths of radio waves from the base station A1 or the like at different positions in the facility. The updater 22 then updates as necessary one or both of the position information 50 and the channel information 60 based on results of the analysis.

For example, in a situation where the channel information 60 indicates that channels available inside the block R1 are channels 1 and 6 (FIG. 4), and in a case where a received signal strength of the channel 6 falls below a lower threshold of a value suitable for using the channel 6 (e.g., −70 dBm) and a received signal strength of a channel 11 exceeds the threshold value, the updater 22 updates the channel information 60 such that the channels available inside the block R1 are the channels 1 and 11.

For example, in a situation where the position information 50 indicates that the block R1 includes the positions P1 and P2 (FIG. 3), and in a case where it is determined that the block R1 should include the positions P1, P2, and P3, the updater 22 updates the position information 50 such that the block R1 includes the positions P1, P2, and P3.

Every time the acquirer 21 receives the strength information, the updater 22 performs the above update process. In a case where a change occurs in the reception strength of a radio wave received actually by the unmanned traveling vehicles 10 at different positions on the track 5, the updater is able to update the channel information in accordance with the change.

The transmitter 23 is a processor configured or programmed to transmit the position information and the channel information updated by the updater 22, to the unmanned traveling vehicles 10. The transmitter 23 is configured to transmit at least one of the position information 50 and the channel information 60 updated by the updater 22, to the unmanned traveling vehicles 10. Even when one of the position information 50 and the channel information 60 is not updated, the transmitter 23 may transmit the one together with the above updated one.

Processes performed by the unmanned traveling vehicles 10 and the controller 20 configured as described above will be described.

Figure 7:
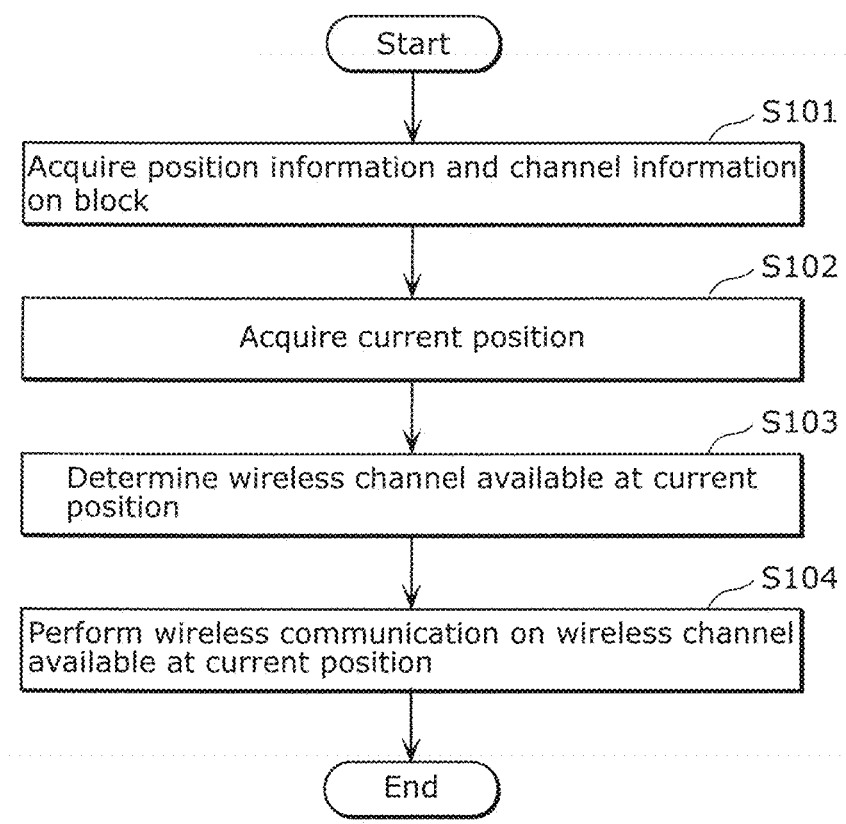
FIG. 7 is a flowchart illustrating processes performed by the unmanned traveling vehicle according to Preferred Embodiment 1 of the present invention.

FIG. 7 is a flowchart illustrating processes performed by the unmanned traveling vehicle 10 according to the present preferred embodiment at a time when the unmanned traveling vehicle 10 determines channels to be used for the wireless communication.

In step S101, the block information acquirer 11 acquires position information 50 indicating a range of positions in an area within which the unmanned traveling vehicle 10 can travel, and channel information 60 indicating channels available inside the block.

In step S102, the position acquirer 12 acquires a current position of the unmanned traveling vehicle 10.

In step S103, the determiner 13 uses the channel information 60 acquired in step S101 by the block information acquirer 11 and the current position acquired in step S102 by the position acquirer 12 to determine the channels to be used for the wireless communication at the current position of the unmanned traveling vehicle 10. More specifically, the determiner 13 refers to the position information to identify a block within which the current position acquired by the position acquirer 12 is located and refers to the channel information to determine channels to be used for wireless communication inside the identified block.

In step S104, the communicator 14 uses the channels determined in step S103 by the determiner 13 to perform the wireless communication.

As a result of performing the above series of processes, the unmanned traveling vehicle 10 determines the channels to be used for the wireless communication at the current position based on the block, which enables the unmanned traveling vehicle 10 to perform roaming without scanning for searching for a new base station. This reduces the time required for the roaming.

Figure 8:
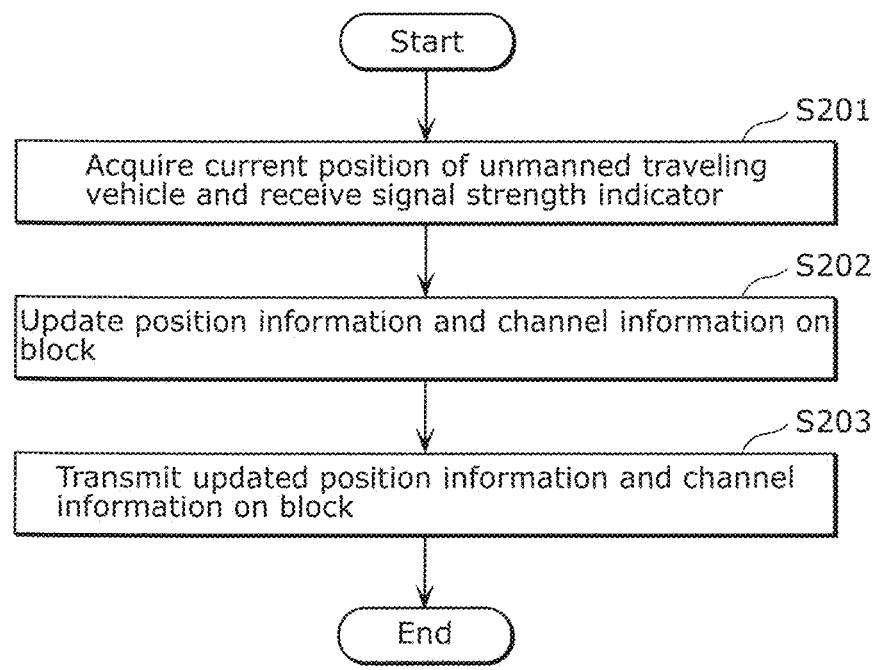
FIG. 8 is a flowchart illustrating processes performed by a controller according to Preferred Embodiment 1 of the present invention.

FIG. 8 is a flowchart illustrating processes performed by the controller 20 according to the present preferred embodiment at a time when the controller 20 updates the position information or the channel information and provides information on the updated position information or the channel information to the unmanned traveling vehicle 10.

In step S201, the acquirer 21 acquires strength information transmitted by the communicator 14 of the unmanned traveling vehicle 10.

In step S202, the updater 22 updates at least one of the position information and the channel information based on the reception strength and the current position included in the strength information acquired in step S201 by the acquirer 21.

In step S203, the transmitter 23 transmits one of the position information and the channel information updated by the updater 22, to the unmanned traveling vehicles 10.

Through the above series of processes, the controller 20 is able to provide the position information and channel information that are appropriate for the unmanned traveling vehicle 10 to determine the channels to be used for the wireless communication at the current position based on the block. The controller 20 updates the position information and the channel information based on the reception strength of a radio wave received actually by the unmanned traveling vehicle 10, and thus in a case where a change occurs in the reception strength of an actual radio wave at different positions, the unmanned traveling vehicle 10 is able to select channels based on position information and channel information adapted to the change.

Modification 1 of Preferred Embodiment 1

The present modification will describe an unmanned traveling vehicle and the like for which a time required for roaming is reduced. In particular, a case where a communicator of the unmanned traveling vehicle includes a single wireless IF will be described.

Figure 9:
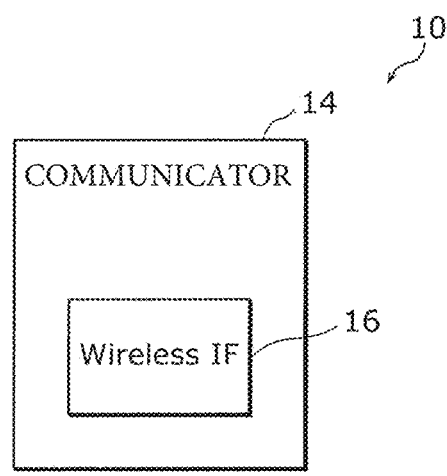
FIG. 9 is a block diagram illustrating a configuration of a communicator according to Variation 1 of Preferred Embodiment 1 of the present invention.

FIG. 9 is a block diagram illustrating a configuration of a communicator 14 according to the present modification.

The configuration of an unmanned traveling vehicle 10 according to the present modification is the same as the configuration of the unmanned traveling vehicle 10 according to Preferred Embodiment 1. Differences from Preferred Embodiment 1 are in that the communicator 14 includes only a single wireless IF 16 (see FIG. 9) and in that a single channel is associated with each block in channel information 61.

Figure 10:
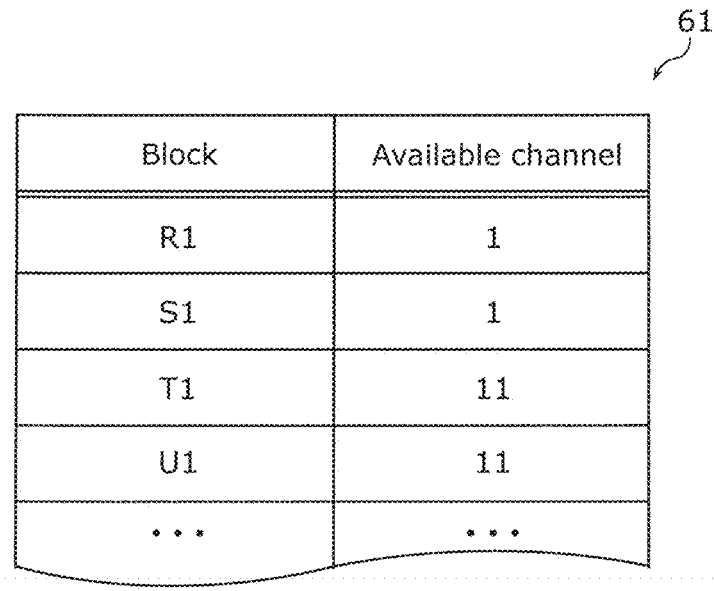
FIG. 10 is an explanatory diagram illustrating channel information according to Variation 1 of Preferred Embodiment 1 of the present invention.

FIG. 10 is an explanatory diagram illustrating the channel information 61 according to the present preferred embodiment.

As illustrated in FIG. 10, each block is associated with a single channel in the channel information 61. Here, one of features of the channel information 61 is that the available channel inside a block is common to a neighboring block of the block. Specifically, for example, in neighboring blocks R1 and S1, the channel 6 is a common available channel. In neighboring blocks S1 and T1, the channel 11 is a common available channel. This has an advantage in that, as in Preferred Embodiment 1, the unmanned traveling vehicle 10 is able to continue communication without roaming when the unmanned traveling vehicle 10 moves to cross a boundary between blocks. Note that it is not necessary to make all neighboring relations of the blocks to have the above-described feature, as described in Preferred Embodiment 1.

Also in a case of including a single wireless IF, the unmanned traveling vehicles 10 are able to reduce the time required for the roaming by using the channel information 61.

Modification 2 of Preferred Embodiment 1

In the present modification, how to define positions in a case of a non-rail-based travel system will be described.

In the non-rail-based travel system, a method for defining positions based on a track cannot be used. Hence, the area within which an unmanned traveling vehicle can move is divided into subareas that are smaller than the blocks (hereinafter, referred to as zones), and the zones are used to define the positions.

Figures 11, 12:
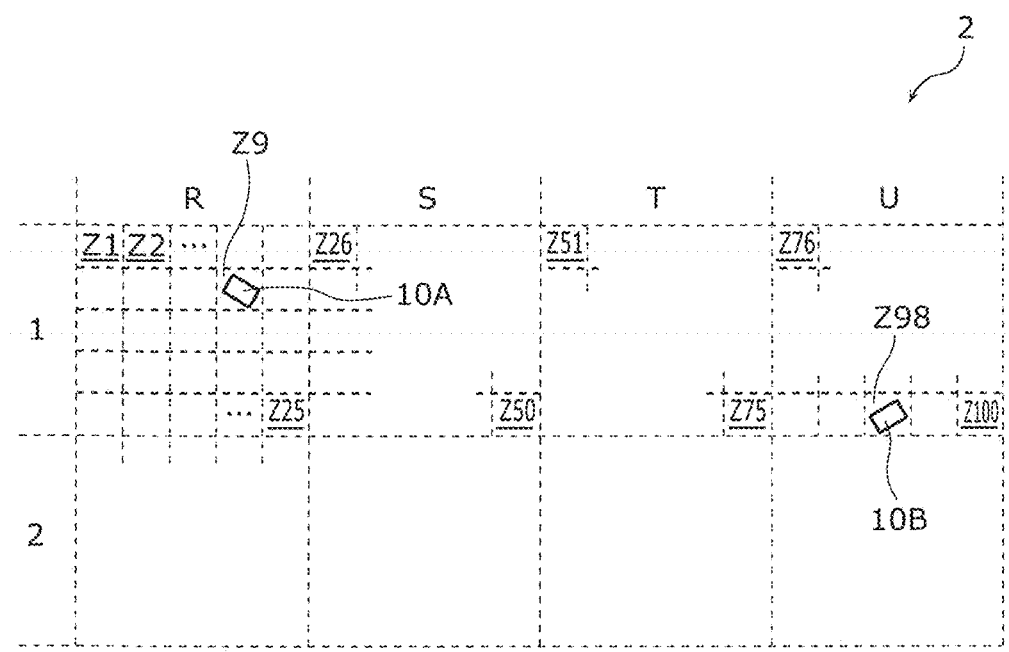
FIG. 11 is a schematic diagram of a travel system including an unmanned traveling vehicle according to Variation 2 of Preferred Embodiment 1 of the present invention.
FIG. 12 is an explanatory diagram illustrating position information on blocks according to Variation 2 of Preferred Embodiment 1 of the present invention.

FIG. 11 is a schematic diagram of a travel system 2 including unmanned traveling vehicles 10A and 10B according to the present modification.

The travel system 2 illustrated in FIG. 11 is a non-rail-based travel system with no track. In the travel system 2, an area within which the unmanned traveling vehicles 10A and 10B can travel is an entire area ranging over eight blocks R1 to U2. This area is divided into a plurality of zones Z1, Z2, . . . (hereinafter, referred to as the zone Z1 and the like). A size of one zone is smaller than a size of one block, and one block includes a plurality of zones. In addition, positions of the zone Z1 and the like are assumed to be predetermined.

In the travel system 2, the position acquirer 12 of each unmanned traveling vehicle 10 is acquires a zone within which each unmanned traveling vehicle 10 is currently located by a well-known method using a radio wave, light, information from the travel controller, information from an acceleration sensor or an orientation sensor, or the like. For example, the position acquirers 12 of the unmanned traveling vehicles 10A and 10B in FIG. 11 acquire information indicating that current positions of the unmanned traveling vehicles 10A and 10B are zones Z9 and Z98.

FIG. 12 is an explanatory diagram illustrating position information 51 on the blocks according to the present preferred embodiment.

The position information 51 illustrated in FIG. 12 is information that associates blocks specified in the area with the zone Z1 and the like included in the blocks.

In the position information 51, entries (rows) represent pieces of information that associate the blocks R1, S1, and the like specified in the area with the zones Z1, Z2, and the like included in each block. The position information can also be regarded as information that associates the zones Z1, Z2, and the like defined on the track 5 with the blocks within which the zones are located.

For example, in the position information 51 illustrated in FIG. 12, a first entry indicates that the zones Z1 to Z25 are associated with the block R1, and a second entry indicates that zones Z26 to Z50 are associated with the block S1.

The determiner 13 is able to identify, based on the position information 51, a block within which the current position acquired by the position acquirer 12 is located, and is able to determine, with reference to the channel information, channels to be used for wireless communication inside the identified block.

In this manner, the position acquirer 12 is able to acquire the position also in the non-rail-based travel system.

As seen from the above, the unmanned traveling vehicle according to the present preferred embodiment performs the wireless communication using wireless channels available at the current position that are specified based on the block within which the unmanned traveling vehicle is located. This enables the wireless communication to be performed with an appropriate wireless channel without carrier sensing (scanning), which is performed by a conventional wireless terminal in roaming. This reduces the time required for the unmanned traveling vehicle to perform the roaming.

In addition, the unmanned traveling vehicle establishes a connection with a base station through an appropriate one among two or more wireless interfaces. The unmanned traveling vehicle is able to use the two or more wireless interfaces for the communication, and thus even when one of the wireless interfaces becomes unable to perform the communication due to roaming, the other is still able to perform the communication. This further reduces a communication interruption time that arises in the roaming by the unmanned traveling vehicle.

In addition, the channel information is defined such that the unmanned traveling vehicle can use a channel common to the two or more neighboring blocks. This allows the unmanned traveling vehicle to avoid performing the roaming when moving from one of the two or more blocks to another, which reduces or prevents the communication interruption time.

In addition, the unmanned traveling vehicle acquires the position information and the channel information that are updated based on a condition of receiving radio waves from a base station at a time when the unmanned traveling vehicle actually travels. This enables the roaming to be performing with the position information and the channel information that are created according to an actual radio-wave condition, thus reducing the time required for the roaming.

In addition, a travel system is able to update the position information and the channel information to be referred to by the unmanned traveling vehicle based on the strength information transmitted by the unmanned traveling vehicle, and is able to provide the updated position information and the updated channel information to the unmanned traveling vehicle. A radio wave condition in wireless communication is able to vary according to disposition of goods, an operational condition of a facility. Hence, by causing the unmanned traveling vehicle to perform the roaming using the position information and the channel information that are created in conformity with an actual radio-wave condition, the time required for the roaming is able to be reduced.

Preferred Embodiment 2

The present preferred embodiment will describe an unmanned traveling vehicle and the like for which a time required for roaming is reduced, particularly an unmanned traveling vehicle that is able to perform communication using two communication interfaces that respectively use different telecommunications standards.

Figures 13, 14:
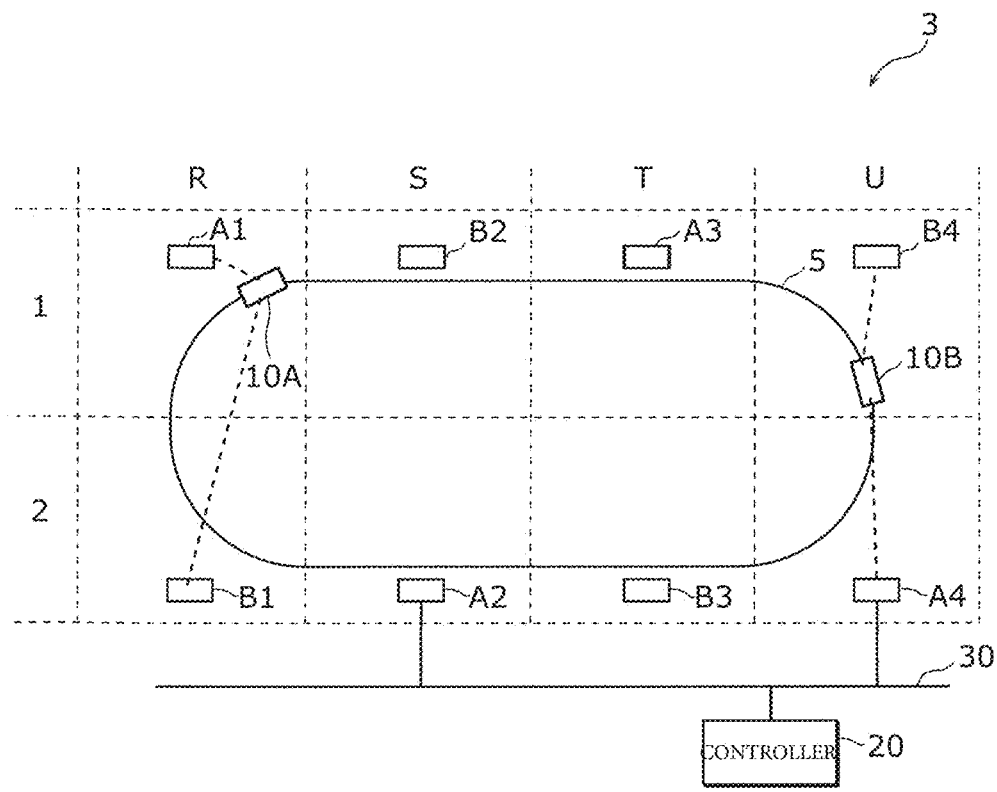
FIG. 13 is a schematic diagram illustrating a network configuration of a travel system that includes an unmanned traveling vehicle according to Preferred Embodiment 2 of the present invention.
FIG. 14 is an explanatory diagram illustrating channel information according to Preferred Embodiment 2 of the present invention.

FIG. 13 is a schematic diagram illustrating a network configuration of a travel system 3 that includes unmanned traveling vehicles according to the present preferred embodiment.

As illustrated in FIG. 13, the travel system 3 has a configuration the same as the configuration of the travel system 1 in the preferred embodiment 1, and further includes base stations B1, B2, B3, and B4 (hereinafter, referred to also as the base station B1 and the like). The base station B1 and the like perform communication using telecommunications standards different from the telecommunications standard used by the base station A1 and the like, and are disposed at positions that enable wireless communication areas of the base stations to cover the track 5 independently of the base station A1 and the like. In other words, the track 5 is covered by two planes, one including the wireless communication areas formed by the base station A1 and the like, and another one including the wireless communication areas formed by the base station B1 and the like.

In the present preferred embodiment, for example, the base station A1 and the like use channels in a 2.4 GHz band (e.g., channels 1, 6, 11, etc. of IEEE 802.11g), and the base station B1 and the like use channels in a 5 GHz band (e.g., channels channel 36, 40, 44, etc. of IEEE 802.11a).

In addition, in the communicator 14, the wireless IF is an interface using a telecommunications standard the same as the telecommunications standard used by the base station A1 and the like, and the wireless IF 17 is an interface using a telecommunications standard the same as the telecommunications standard supposed by the base station B1 and the like.

FIG. 14 is an explanatory diagram illustrating channel information 62 according to the present preferred embodiment.

As illustrated in FIG. 14, each block is associated with one channel of the 2.4 GHz band and one channel of the 5 GHz band in the channel information 62. For example, a first entry of the channel information 62 indicates that a channel 1 of the 2.4 GHz band and a channel 36 of the 5 GHz band are available inside the block R1.

This enables the unmanned traveling vehicle to perform roaming without scanning for searching for a new base station while performing the wireless communication using the two telecommunications standards concurrently. This reduces the time required for the roaming. In addition, this has an advantage in that the unmanned traveling vehicle 10 is able to continue communication without arising of a communication interruption time when the unmanned traveling vehicle 10 moves to cross a boundary between blocks. The concurrent use of the two telecommunications standards has an advantage in that the wireless communication is less susceptible to noise than a case where of using only one telecommunications standard. Note that it is not necessary to make all neighboring relations of the blocks to have the above-described feature, as described in Preferred Embodiment 1.

As seen from the above, the unmanned traveling vehicle according to the present preferred embodiment can use an appropriate one among the two or more different telecommunications standards through a corresponding one of the two or more wireless interfaces to perform the wireless communication. In general, different telecommunications standards lead to different results or magnitudes of the influence of external noise. This increases a possibility that even if communication conforming to one of telecommunications standards becomes disabled under influence of external noise or the like, communication conforming to another telecommunications standard is still enabled, which is able to further reduce a time during which the unmanned traveling vehicle cannot perform communication.

Although the unmanned traveling vehicle and the like according to the present invention have been described based on the above preferred embodiments, the present invention is not limited to the preferred embodiments. The present invention includes various modifications to the preferred embodiments and any combinations of elements, steps, features, etc. of the different preferred embodiments if they do not depart from the scope of the present invention.

Preferred embodiments of the present invention are applicable to an unmanned traveling vehicle and a travel system for which a time required for roaming is to be reduced. Specifically, preferred embodiments of the present invention are available to, for example, an unmanned traveling vehicle that moves in an area covered by a plurality of base stations while dynamically establishing a communication link to perform communication with one of the plurality of base stations.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An unmanned traveling vehicle, comprising:
  a block information acquirer to acquire position information and channel information, the position information being information on blocks each of which is a range of positions in an area within which the unmanned traveling vehicle is allowed to travel, the channel information indicating a wireless channel available inside each of the blocks;
  a position acquirer to acquire a current position of the unmanned traveling vehicle;
  a determiner to identify, with reference to the position information, a block including the current position acquired by the position acquirer from among the blocks, and determine, with reference to the channel information, a wireless channel to be used for wireless communication inside the block identified; and
  a communicator to perform the wireless communication using the wireless channel determined by the determiner and indicated by the channel information; wherein
  the block information acquirer acquires, as the channel information, channel information indicating two or more wireless channels available inside each of the blocks;
  the determiner determines, with reference to the channel information, two or more wireless channels to be used for the wireless communication inside the block identified; and
  the communicator includes two or more wireless interfaces, and performs the wireless communication using the two or more wireless channels determined by the determiner through the two or more wireless interfaces.

2. The unmanned traveling vehicle according to claim 1, wherein the two or more wireless interfaces included in the communicator use telecommunications standards different from one another.

3. The unmanned traveling vehicle according to claim 1, wherein
  the position information includes at least position information of each of two neighboring blocks among the blocks; and
  in the channel information, at least one of wireless channels available inside the two neighboring blocks is shared by the two neighboring blocks.

4. The unmanned traveling vehicle according to claim 1, wherein
  the communicator further transmits strength information to a controller, the strength information indicating a reception strength of a radio wave from a base station and the current position acquired by the position acquirer; and
  the block information acquirer acquires, as the position information and the channel information, position information and channel information that are updated by the controller based on the reception strength transmitted by the communicator.

5. A traveling system, comprising:
  an acquirer to acquire strength information transmitted by a communicator of an unmanned traveling vehicle, the strength information indicating a reception strength of a radio wave from a base station and a current position of the unmanned traveling vehicle acquired by a position acquirer of the unmanned traveling vehicle;

an updater to update at least one of position information and channel information based on the reception strength and the current position included in the strength information acquired by the acquirer; and a transmitter to transmit the at least one of the position information and the channel information updated by the updater to the unmanned traveling vehicle; wherein the unmanned traveling vehicle includes:

a block information acquirer to acquire the position information and the channel information, the position information being information on blocks each of which is a range of positions in an area within which the unmanned traveling vehicle is allowed to travel, the channel information indicating a wireless channel available inside each of the blocks;

the position acquirer to acquire the current position of the unmanned traveling vehicle;

a determiner to identify, with reference to the position information, a block including the current position acquired by the position acquirer from among the blocks, and determine, with reference to the channel information, a wireless channel to be used for wireless communication inside the block identified; and the communicator to perform the wireless communication using the wireless channel determined by the determiner and indicated by the channel information;

the block information acquirer acquires, as the channel information, channel information indicating two or more wireless channels available inside each of the blocks;

the determiner determines, with reference to the channel information, two or more wireless channels to be used for the wireless communication inside the block identified;

the communicator includes two or more wireless interfaces, and performs the wireless communication using the two or more wireless channels determined by the determiner through the two or more wireless interfaces;

the communicator transmits the strength information to the acquirer; and the block information acquirer acquires, as the position information and the channel information, the position information and the channel information that are updated by the updater.

6. A method for controlling an unmanned traveling vehicle, the method comprising:

acquiring position information and channel information, the position information being information on blocks each of which is a range of positions in an area within which the unmanned traveling vehicle is allowed to travel, the channel information indicating a wireless channel available inside each of the blocks;

acquiring a current position of the unmanned traveling vehicle;

identifying, with reference to the position information, a block including the current position acquired in the acquiring of the current position from among the blocks;

determining, with reference to the channel information, a wireless channel to be used for wireless communication inside the block identified;

performing the wireless communication by the wireless channel determined in the determining and indicated by the channel information; wherein channel information indicating two or more wireless channels available inside each of the blocks is acquired as the channel information;

with reference to the channel information, two or more wireless channels to be used for the wireless communication inside the block identified are determined; and the wireless communication is performed using the two or more wireless channels through two or more wireless interfaces.

* * * * *